US006463509B1

(12) United States Patent
Teoman et al.

(10) Patent No.: US 6,463,509 B1
(45) Date of Patent: Oct. 8, 2002

(54) PRELOADING DATA IN A CACHE MEMORY ACCORDING TO USER-SPECIFIED PRELOAD CRITERIA

(75) Inventors: Deniz Teoman, San Mateo; John M. Neil, San Francisco, both of CA (US)

(73) Assignee: Motive Power, Inc., San Mateo, CA (US)

(*) Notice: Subject to any disclaimer, the term of this patent is extended or adjusted under 35 U.S.C. 154(b) by 0 days.

(21) Appl. No.: 09/238,656

(22) Filed: Jan. 26, 1999

(51) Int. Cl.$^7$ .............................................. G06F 12/00
(52) U.S. Cl. ........................ 711/137; 711/118; 711/141; 711/152; 711/113
(58) Field of Search ................................ 711/118, 137, 711/138, 129, 113, 141, 152, 3, 125; 710/52; 713/400; 714/5

(56) References Cited

U.S. PATENT DOCUMENTS

| | | |
|---|---|---|
| 3,609,665 A | 9/1971 | Kronies |
| 3,806,888 A | 4/1974 | Brickman et al. |
| 4,020,466 A | 4/1977 | Cordi et al. |
| 4,215,400 A | 7/1980 | Denko |
| 4,295,205 A | 10/1981 | Kunstadt |
| 4,342,079 A | 7/1982 | Stewart et al. |
| 4,435,775 A | 3/1984 | Brantingham et al. |
| 4,500,954 A * | 2/1985 | Duke et al. ................. 711/138 |
| 4,637,024 A * | 1/1987 | Dixon et al. ................. 714/819 |
| 5,128,810 A | 7/1992 | Halford |
| 5,131,089 A | 7/1992 | Cole |
| 5,146,576 A | 9/1992 | Beardsley |
| 5,218,689 A | 6/1993 | Hotle |
| 5,226,168 A | 7/1993 | Kobayashi et al. |
| 5,263,142 A | 11/1993 | Watkins et al. |
| 5,287,457 A | 2/1994 | Arimilli et al. |
| 5,291,584 A | 3/1994 | Challa et al. |
| 5,293,622 A | 3/1994 | Nicholson et al. |
| 5,359,713 A * | 10/1994 | Moran et al. ................. 710/52 |
| 5,396,596 A | 3/1995 | Hashemi et al. |
| 5,420,998 A | 5/1995 | Horning |
| 5,437,018 A | 7/1995 | Kobayashi et al. |
| 5,448,719 A * | 9/1995 | Schultz et al. ................. 714/5 |

(List continued on next page.)

OTHER PUBLICATIONS

International Search Report in connection with International Application No. PCT/US00/02156 (6 pages).

"The I/O System", Inside Windows NT Second Edition, Microsoft Press, David A. Solomon, pp. v–xiv, 325–393, 1998.

"Filter Drivers", Windows NT File System Internals A Developer's Guide, Rajeev Nagar, O'Rielly & Associates, Inc., pp. vii–x, 615–667, 1997.

Primary Examiner—David Hudspeth
Assistant Examiner—Fred F. Tzeng
(74) Attorney, Agent, or Firm—Blakely, Sokoloff, Taylor & Zafman LLP

(57) ABSTRACT

An apparatus and method for caching data in a storage device of a computer system. A relatively high-speed, intermediate-volume storage device is operated as a user-configurable cache. Requests to access a mass storage device such as a disk or tape are intercepted by a device driver that compares the access request against a directory of the contents of the user-configurable cache. If the user-configurable cache contains the data sought to be accessed, the access request is carried out in the user-configurable cache instead of being forwarded to the device driver for the target mass storage device. Because the user-cache is implemented using memory having a dramatically shorter access time than most mechanical mass storage devices, the access request is fulfilled much more quickly than if the originally intended mass storage device was accessed. Data is preloaded and responsively cached in the user-configurable cache memory based on user preferences.

26 Claims, 12 Drawing Sheets

U.S. PATENT DOCUMENTS

| | | |
|---|---|---|
| 5,459,850 A | 10/1995 | Clay et al. |
| 5,483,641 A | 1/1996 | Jones et al. |
| 5,493,574 A | 2/1996 | McKinley |
| 5,515,525 A | 5/1996 | Grynberg et al. |
| 5,519,853 A * | 5/1996 | Moran et al. ............... 713/400 |
| 5,551,000 A | 8/1996 | Tan et al. |
| 5,555,402 A | 9/1996 | Tuma et al. |
| 5,594,885 A | 1/1997 | Lautzenheiser |
| 5,603,011 A | 2/1997 | Piazza |
| 5,633,484 A | 5/1997 | Zancho et al. |
| 5,657,470 A | 8/1997 | Fisherman et al. |
| 5,673,394 A | 9/1997 | Fenwick et al. |
| 5,680,570 A | 10/1997 | Rantala et al. |
| 5,680,573 A * | 10/1997 | Rubin et al. ................ 711/129 |
| 5,692,190 A | 11/1997 | Williams |
| 5,694,567 A * | 12/1997 | Bourekas et al. ............... 711/3 |
| 5,694,570 A * | 12/1997 | Beardsley et al. .......... 711/113 |
| 5,712,811 A | 1/1998 | Kim |
| 5,732,267 A | 3/1998 | Smith |
| 5,737,619 A | 4/1998 | Judson |
| 5,745,773 A | 4/1998 | Mizuta |
| 5,778,418 A | 7/1998 | Auclair et al. |
| 5,787,470 A | 7/1998 | DeSimone et al. |
| 5,802,566 A * | 9/1998 | Hagersten ................... 711/137 |
| 5,895,487 A | 4/1999 | Boyd et al. |
| 5,913,224 A * | 6/1999 | MacDonald ................. 711/125 |
| 6,003,115 A * | 12/1999 | Spear et al. ................. 711/137 |

* cited by examiner

PRELOADING DATA IN A CACHE MEMORY ACCORDING TO USER-SPECIFIED PRELOAD CRITERIA

FIELD OF THE INVENTION

The present invention relates to the field of data storage in computer systems, and more particularly to a user-configurable cache memory implemented in a high-speed storage.

BACKGROUND OF THE INVENTION

Many modem computer systems use input/output (I/O) buffering to speed access to data stored in mass storage media such as disk or tape drives. The idea behind I/O buffering is to store frequently accessed data from mass storage in a relatively small memory that can be accessed more quickly than the mass storage itself. Two common types of I/O buffering are operating system (OS) cache and self-buffered mass storage. In an OS cache, the operating system reserves a portion of system memory to buffer data obtained from mass storage. The OS responds to mass storage access requests by determining whether the data sought to be accessed is buffered in the reserved portion of system memory and, if so, performing the requested access in system memory without accessing mass storage.

OS cache has a number of disadvantages. First, because the system memory used for data buffering is usually volatile, the OS cache contents are lost when the computer system is powered down. Consequently, the OS cache must be reloaded each time the computer system is booted. Among other things, this makes the OS cache unsuitable to source boot files during system startup. Another disadvantage of OS cache is that the amount of system memory reserved for data buffering in the OS cache usually is limited because system memory is needed for other purposes, such as providing space for user applications. In some cases, the amount of system memory reserved data buffering may be dynamically reduced in response to requests to provide system memory for other purposes. Yet another disadvantage of OS cache is that the algorithm used to control what data is stored and what data is overwritten in the data buffer usually does not support user-preferences to cache certain types or groups of files.

In a self-buffered mass storage, the mass storage hardware includes a relatively small buffer memory that is used to hold the contents of recently accessed regions of the mass storage media. When an access request (e.g., a read or write request) is received in the mass storage, control circuitry for the mass storage first determines whether the access hits the contents of the buffer memory. If so, the access occurs in the buffer memory, potentially saving the time required to access the mass storage media itself. Unfortunately, self-buffered mass storage suffers from many of the same disadvantages as OS cache. Specifically, the contents of the buffer memory are usually lost on power down, and the algorithm used to control what data is stored in the data buffer typically does not support user-preferences. Another disadvantage of self-buffered mass storage is that, because the buffer memory is used only for accesses to the associated mass storage, data from other I/O sources are not buffered. For example, the buffer memory of a self-buffered mass storage device typically cannot be used to buffer data from other non-buffered mass storage devices in the computer system or data from mass storage devices outside the computer system such as network servers.

SUMMARY OF THE INVENTION

A method and apparatus for storing data in a cache memory of a computer system. User input is received that requests data to be stored in the cache memory. If the data is not already stored in the cache memory, the data is retrieved from a mass storage coupled to the computer system and stored in the cache memory.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
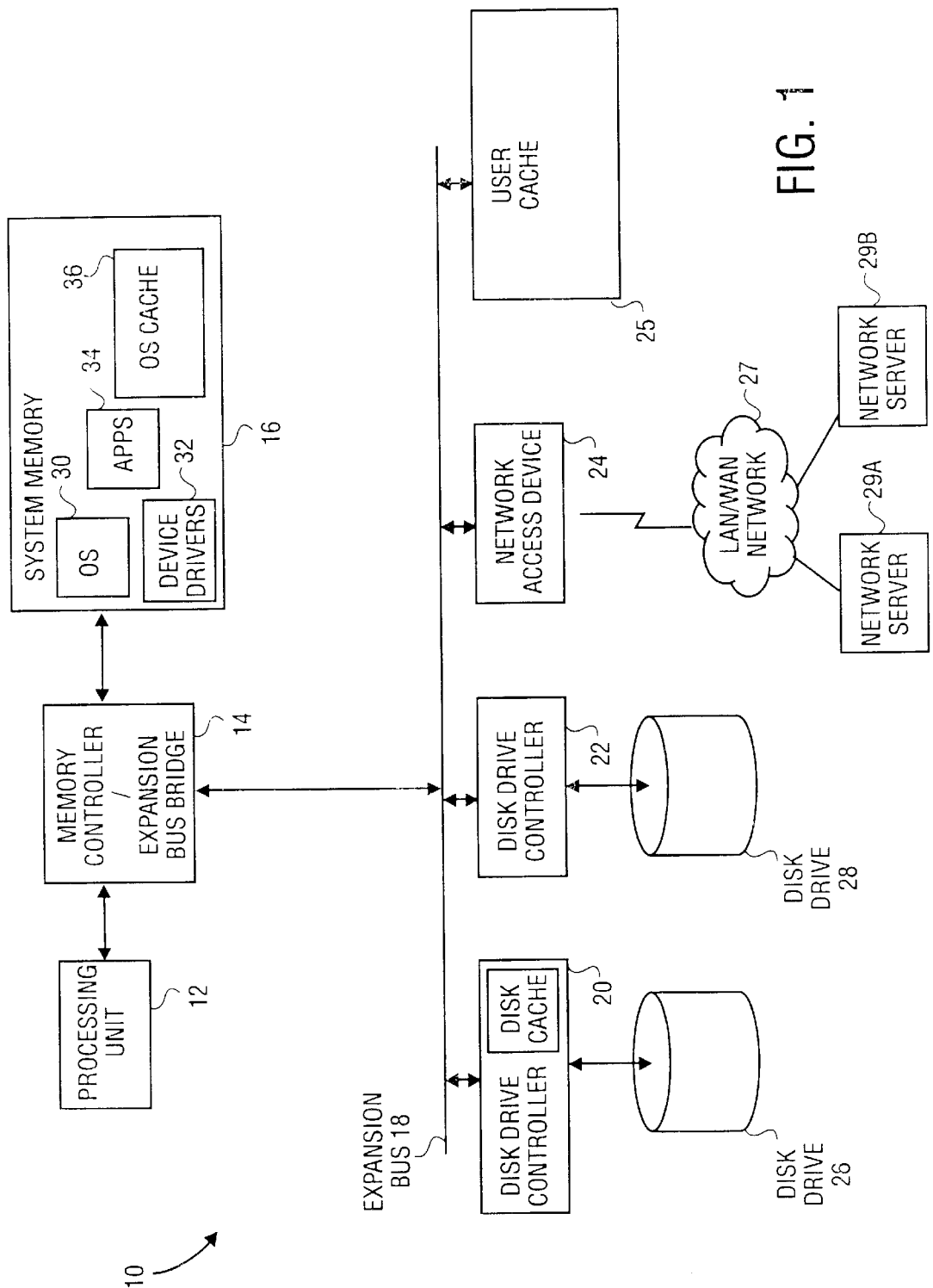
FIG. 1 is a block diagram of a computer system according to one embodiment.

A relatively high-speed, intermediate-volume storage device is operated as a user-configurable cache memory ("user cache") to provide I/O buffering. In one embodiment, the user cache is implemented using random access memory (RAM) arranged on a hardware module that is coupled to an expansion bus in a computer system. Requests to access a mass storage device such as a disk or tape drive are intercepted by a device driver that compares the access request against a directory of the contents of the user-cache. If the user-cache contains the data sought to be accessed, the access request is carried out in the user-cache instead of being forwarded to the device driver for the target mass storage device. Because the user-cache is implemented using memory having a dramatically shorter access time than most electro-mechanical mass storage devices, the access request is fulfilled much more quickly than if the originally intended mass storage device was accessed.

In one embodiment, the user-cache is non-volatile and large enough to hold several hundred megabytes worth of data. Consequently, by configuring the user-cache to store program code and configuration information used for computer system startup, the user-cache may be used as a boot source to provide much faster system boot up than can be achieved by booting out of mass storage media such as disk or tape.

In another embodiment, an application program called a user cache manager is executed to receive user preferences as to what data to store and not to store in the user cache. For example, a user may specify to cache the contents of a folder or directory (e.g., the system directory that includes much of the operating system and system configuration files), files having a particular file type identifier (e.g., files with a given filename extension), files having particular file names, files accessed by a particular user and so forth. Further, unlike self-buffered mass storage, the user cache is not limited to caching information from a particular mass storage device. The user cache may be used to cache data from any storage device in the computer system or even to cache remotely located data, such as a web page identified by a user-specified specified uniform resource locator (URL) or files or directories located on a server computer. A user may also specify particular files, directories, URLs or other file identification criteria indicating files that are to be excluded from the user cache. Further, in at least one embodiment, the user is prompted to indicate whether files selected for caching are to be "locked down" in the user cache. Files that are locked down in the user cache are not flushed (i.e., overwritten or otherwise expelled) from the user cache if the user cache becomes full. In this way, files such as system startup files may be locked down in the cache to ensure their availability during system startup. These and other intended advantages of the present invention are described below in various embodiments.

Overview of a System That Includes User Cache

FIG. 1 is a block diagram of a computer system 10 according to one embodiment. The computer system includes a processing unit 12, a system memory 16 and an expansion bus 18, all interconnected by a memory controller/expansion bus bridge device 14. The expansion bus 18 supports connection of a number of I/O devices including a self-buffered disk drive controller 20 and its associated disk drive 26, a non-buffered disk drive controller 22 and its associated disk drive 28, a network access device 24 such as a modem or local/wide area network communications card and a user cache 25. Other I/O devices may be coupled to the expansion bus according to user needs. As shown in FIG. 1, the network access device 24 is used to couple the computer system 10 to a local or wide area network 27 which may support number of devices, including one or more network servers 29A, 29B.

According to one embodiment, the user cache 25 is a non-volatile storage array that is used to cache data from mass storage devices, such as the local disk drives 26, 28 or disk drives on network servers 29A, 29B. Preferably, the user cache 25 is constructed using random access memory components that have access times several orders of magnitude shorter than the mass storage devices that source the cached data. Consequently, by redirecting requests to access a mass storage device to instead access the user cache 25, the overall time required to complete the requested access can be dramatically reduced. The implementation and operation of the user cache 25 is discussed in detail below.

Still referring to FIG. 1, the processing unit 12 includes one or more processors that fetch program code from system memory 16 and execute the code to operate on data and to read and write data to the system memory 16 and to the I/O devices on the expansion bus 18. Although not shown, the computer system also includes input devices to receive user-input (e.g., keyboard and mouse) and a display device for presenting a user interface.

The program code in the system memory 16 includes operating system (OS) program code 30, application program code 34 and device driver program code 32. The application program code 34 is executed by the processing unit 12 to implement application processes which, in turn, invoke operating system services to display user-interfaces, operate on user-input and access user-specified data. Services provided by the operating system 30 include memory management services, I/O management services, process and thread management services and so forth. The operating system 30 also supports independently installable device drivers 32. Each of the device drivers 32 is a program code entity that includes a prescribed set of routines that adhere to a specification defined by the operating system 30 and that can be invoked to process the various stages of an input/output request. Thus, the device drivers 32 provide a well defined, relatively simple set of services to the operating system 30 to permit the operating system 30 to interact with a broad range of hardware devices without having to include device specific program code in the operating system 30. For example, when an application process invokes an operating system service to perform I/O to a device attached to the expansion bus 18, the operating system 30 invokes a standard routine within the appropriate device driver 32 to carry out the requested I/O.

Overview of a Memory Hierarchy

Figure 2:
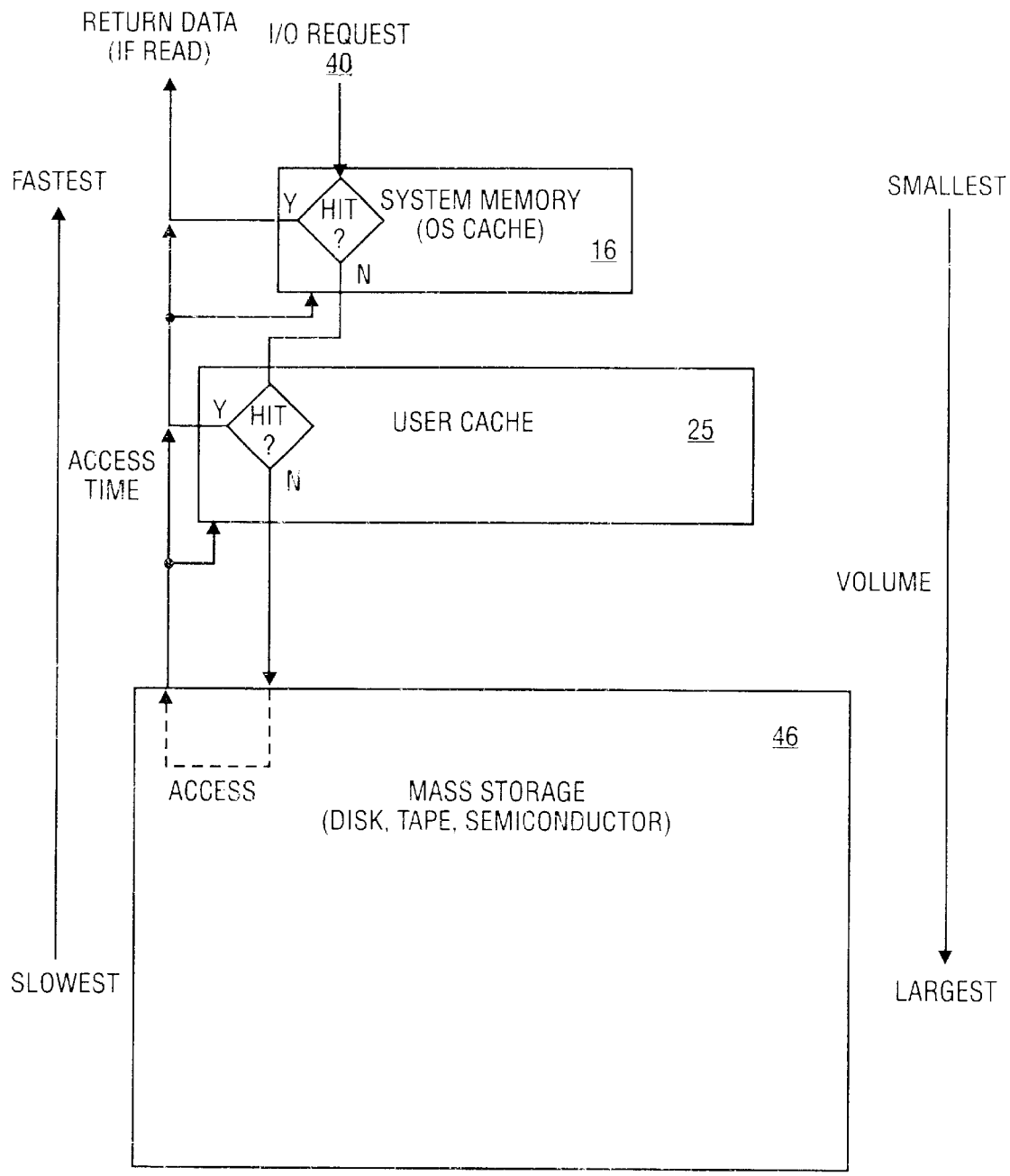
FIG. 2 illustrates a memory hierarchy in a computer system that includes a user cache 25 according to one embodiment.

FIG. 2 illustrates a memory hierarchy in a computer system that includes a user cache 25 according to an embodiment of the present invention. As indicated in FIG. 2, the user cache 25 preferably has an intermediate storage volume and access time relative to the system memory 16 and the mass storage 46, but this is not required. Also, because the computer system may be a network of computers, the mass storage 46 need not be in the same machine as the system memory 16 and the user cache 25. For example, the mass storage 46 may be a disk drive on a network server that is accessible via a local or wide area network (LAN or WAN) or that can be accessed via the Internet using any number of transfer protocols including file transfer protocol (FTP), hyper-text transfer protocol (HTTP) and so forth.

When an I/O request 40 to access the mass storage 46 is issued (e.g., a file read or write request issued in the course of executing an application program), the I/O request 40 is first applied to the OS cache maintained in system memory 16. If the I/O request 40 hits the OS cache (i.e., the data sought to be accessed is cached in the OS cache), the access is performed in the OS cache. If the I/O request 40 is a read request, the data is returned to the requestor. If the I/O request 40 does not hit the OS cache, the I/O request 40 is redirected from the mass storage 46 to the user cache 25 by software mechanisms described below. If the I/O request 40 hits the user cache 25, the access is performed in the user cache 25 without having to access the mass storage 46, thereby substantially reducing the overall access time. Also, because the user cache 25 is significantly larger than the OS cache and supports data preloading (discussed below), much higher hit rates can be achieved in the user cache than in the OS cache. Consequently, significantly fewer I/O accesses to the mass storage device need to be performed than in prior art systems that rely solely on the OS cache for I/O buffering. Also, unlike storage buffers in self-buffered mass storage devices, the user cache is not limited to caching data for a particular mass storage device. Instead the user cache can be used to cache I/O data from a variety of sources, including data from remote storage devices such as network servers and web servers.

Still referring to FIG. 2, if the I/O request 40 is a read request and the read request hits the user cache 25, data is returned to the requestor from the user cache 25. If space permits, the returned data may also be stored in the OS cache. If the read request misses the user cache 25, the data is returned from the mass storage 46 and conditionally stored in the user cache 25. The conditions used to determine whether to store data obtained from mass storage 46 in the user cache 25 are described below. Data returned from the mass storage 46 may also be stored in the OS cache.

Overview of a Method

Figure 3:
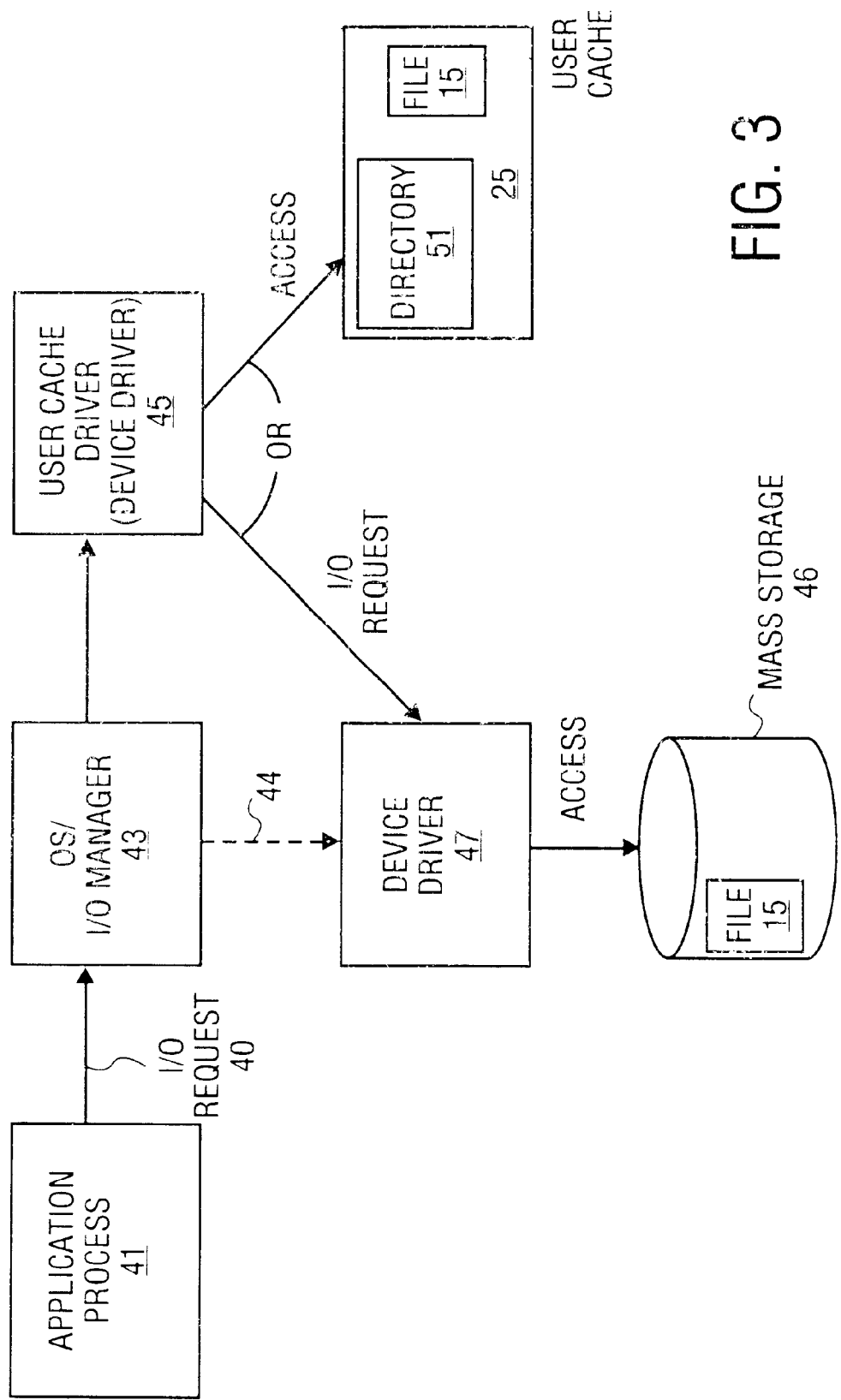
FIG. 3 illustrates the flow of an I/O request according to one embodiment.

FIG. 3 illustrates the flow of an I/O request according to one embodiment. Herein, the expression "I/O request" refers to a request to read from or write to an address that does not resolve to system memory. Initially, an application process 41 generates an I/O request 40 to read or write a file 15 stored on a mass storage device 46. A service in the operating system called an I/O manager 43 receives the I/O request 40 and identifies a device driver 47 associated with the request based on a logical identifier included in the request 40. For example, a request to read data from file "C:\myfiles\data.txt" indicates that the file data.txt is to be read from logical disk drive C and is organized under subdirectory "myfiles." Ordinarily, the I/O manager 43 will pass the I/O request to the device driver 47 for the mass storage device 46 as shown by dashed arrow 44. In the embodiment of FIG. 3, however, a device driver called a user cache driver 45 has been inserted into the device driver hierarchy above the device driver 47 to intercept the I/O request before it reaches the device driver 47. The user cache driver 45 inspects a directory 51 of the user cache contents to determine whether the data sought to be accessed (i.e., file 15) is in the user cache 25. If the file 15 is in the user cache, the user cache driver redirects the I/O request to access the user cache 25 instead of forwarding the I/O request to the device driver 47. Otherwise, the user cache driver forwards the I/O request to the device driver 47 which in turn accesses the file 15 in mass storage 46.

In one embodiment, the directory 51 is maintained in the user cache 25 to prevent loss of the directory 51 at power down. At power up, the directory 51 is copied from the user cache 25 to a shadow directory in system memory. The user cache driver 45 accesses the shadow directory instead of the directory 51 to more quickly determine whether to redirect I/O requests to the user cache 25. In an alternate embodiment, the shadow directory is not maintained and the directory 51 in the user cache is used to determine whether to redirect I/O requests. Although more time is required to make the redirect determination without the shadow directory, the programming effort required to ensure coherency between the shadow directory and the directory 51 in the user cache is saved.

It should be noted that the user cache 25 is not simply used to implement a hierarchical storage system in which data is either stored in the user cache or alternatively in the mass storage 46 (e.g., in a typical hierarchical storage system, data may be swapped between a relatively fast and a relatively slow mass storage according to system needs). Instead, the user cache is operated to cache data from the mass storage. That is, a copy of the data stored in the mass storage 46 is stored in the user cache along with a directory entry indicating the address of the corresponding data in mass storage. Also, unless otherwise made clear from context, the term data is used broadly herein to refer to both program code and operand data.

User Cache Hardware

Figure 4:
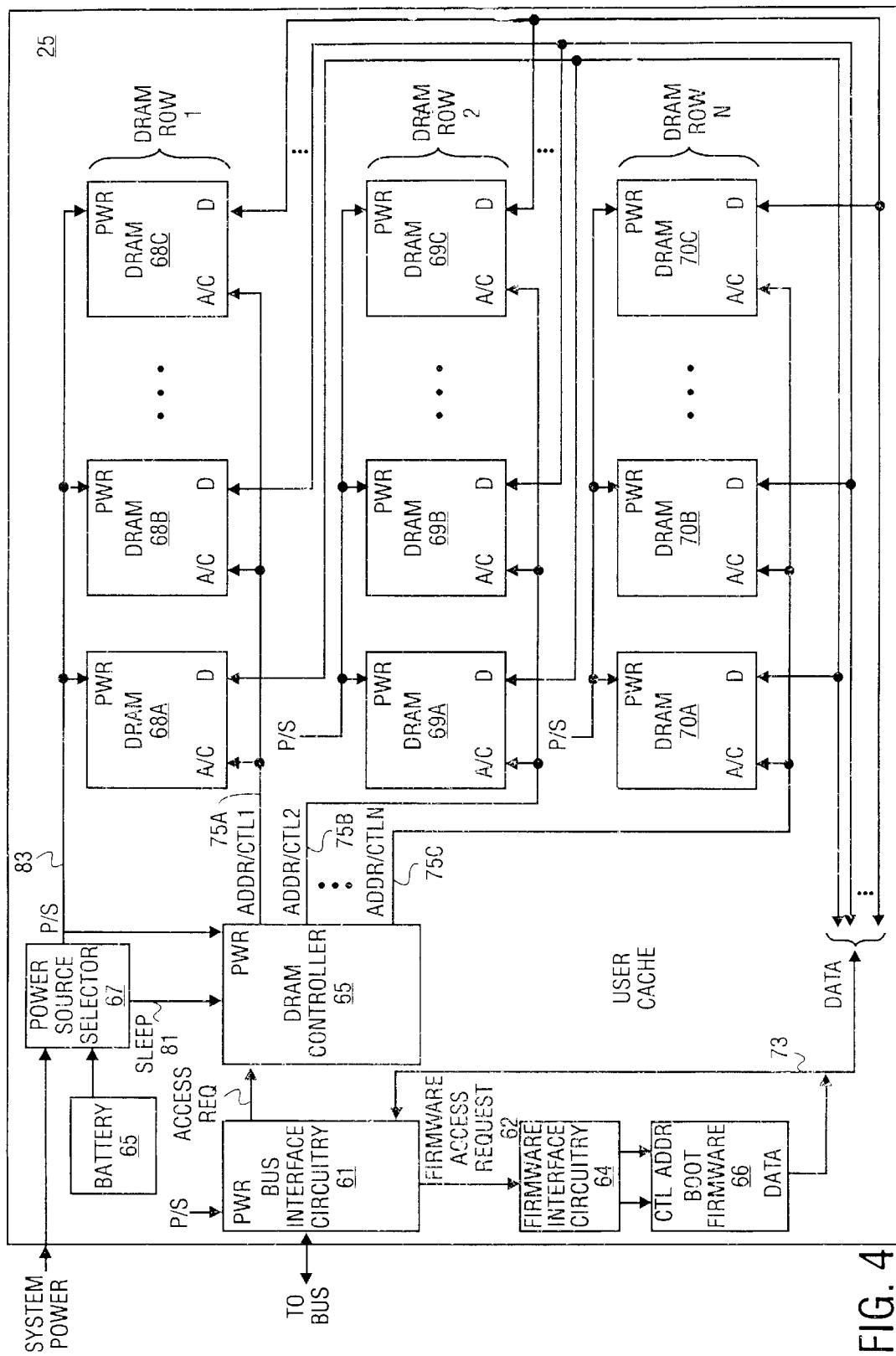
FIG. 4 is a block diagram of the user-cache according to one embodiment.

FIG. 4 is a block diagram of the user-cache 25 according to one embodiment. The user-cache 25 includes bus interface circuitry 61, a DRAM controller 63 and a plurality of rows (1 through N) of DRAM components 68A–68C, 69A–69C, 70A–70C. Each of the DRAM components includes an address and control input (A/C), a data path interface (D) and a power input (PWR). The data path interface of each DRAM component within a given row is coupled to the bus interface circuitry 61 via a respective portion of a datapath 73. The address and control inputs of the DRAM components within a given row are coupled to a common address path and a common control path from the DRAM controller 63. The address path and control path for each DRAM row are depicted for simplicity in FIG. 4 as a single path ADDR/CTL 75A, 75B, 75C. In one embodiment, the address path is a multiplexed address path in which a row and column address components of a complete address are transferred to the DRAM components in separate transfers. The control path to each row of DRAM components provides a set of signals that indicate, for example, when to strobe a row or column address into a row of DRAM components, when to activate or precharge an addressed row of memory cells within a row of DRAM components, and whether to read or write a column of data within an activated row of memory cells. Commands to enter reduced power state and to perform refresh operations are also delivered via the control path.

According to one embodiment, older generation DRAM components, such as synchronous DRAM (SDRAM) components are used in the user cache 25 to implement a relatively large storage array at relatively low cost. For example, a 256 megabyte (MB) user cache may be implemented at relatively low cost using eight 32 MB SDRAM components. User caches having larger or smaller storage capacity may be implemented using even older generation DRAM components (e.g., extended data out (EDO) DRAM, fast page mode (FPM) DRAM), or by using SDRAM components having different total storage and bit slice sizes.

It will usually be unnecessary to resort to faster, more expensive types of memory, because even older generation DRAM components such as SDRAM are capable of delivering and receiving data at rates that exceed the bandwidth of most expansion buses. Nonetheless, higher performance memory components including, but not limited to, Rambus DRAM, SyncLink DRAM or later developed memory types may be used to implement the user cache (Rambus is a trademark of Rambus Corporation). Also, in alternate embodiments, memory components other than DRAM may be used, including, but not limited to, ferro-magnetic RAM (FRAM), electrically erasable programmable read only memory (EEPROM, including Flash EEPROM), static RAM and holographic memory. Generally, any type of solid state memory or other memory that provides a speed advantage over electro-mechanical or other mass storage devices may be used without departing from the scope of the present invention.

In one embodiment, the user cache 25 includes a power source selector 67 that selects between a battery 65 and system power to power the DRAM array. In many modern computer systems, a reduced level of system power, called "trickle power," is available so long as the computer system is connected to line power. In such systems, trickle power can be used to power the user cache even when the computer system is turned off. When system power is lost entirely, the power source selector detects the power loss and switches to the battery 65 to maintain power to the DRAM array. Preferably the battery 65 is recharged when system power is applied so that, if and when complete system power loss occurs, the battery 65 will be fully charged to provide auxiliary power.

In one embodiment, the power source selector 67 distinguishes between full system power and trickle power and asserts a sleep signal 81 to the DRAM controller 63 whenever the user cache is being powered by trickle power or battery power. The DRAM controller 63 responds to the sleep signal 81 by issuing control signals to place the DRAM components of the user cache 25 in reduced power state. In the reduced power state, DRAM refresh operations are continued either under control of the DRAM controller 63 or by logic on board the DRAM components themselves. Other logic elements within the user-cache 25, including the bus interface circuitry 61 and portions of the DRAM controller that operate on access requests from the bus interface circuitry are shut down to save power. Unused rows of the DRAM array may be shut down to save power.

In one embodiment, the expansion bus 18 of FIG. 1 is a peripheral component interconnect (PCI) bus and the bus interface circuitry 61 of the user cache 25 is a PCI bus interface for sending and receiving data, address and control signals on the PCI bus. Herein, PCI bus refers to a data communication bus that conforms to the PCI Local Bus Specification (Revision 2.1, published Jun. 1, 1995 or later revisions), and includes extensions to the PCI bus such as the so-called PCI-X bus In alternate embodiments, the bus interface circuitry 61 may be used to interface other types of buses, including, but not limited to, an industry standard architecture (ISA) bus, extended ISA (EISA) bus, a Microchannel bus, or any other bus that may be used to transfer data, address and control information to the user cache 25. In alternate embodiments, communication paths other than buses may be used to interface the user cache module (e.g., switching fabrics).

According to one embodiment, the user cache 25 includes boot firmware 66 for storing program code that is used to support operation of the user cache at system startup. Decode logic in the bus interface circuitry determines whether access requests are directed to the cache memory array (e.g., the DRAM array) or to the boot firmware 66. Requests which decode to the boot firmware are issued as firmware access requests 62 to firmware interface circuitry 64. The firmware interface circuitry 64 issues appropriate address and control signals to the boot firmware 66 which responds by driving boot program code onto the datapath 73. The program code is returned to the bus interface circuitry 61 which outputs it to the expansion bus where it is routed to its ultimate destination (e.g., the processor used to execute system boot code). The boot firmware 66 may be implemented using a number of different types of non-volatile memory including, but not limited to, programmable read only memory (PROM), erasable PROM (EPROM), electrically erasable PROM (EEPROM), flash EEPROM, and so forth. Use of the boot firmware 66 to support system startup is described in further detail below.

I/O Request Processing

Figure 5:
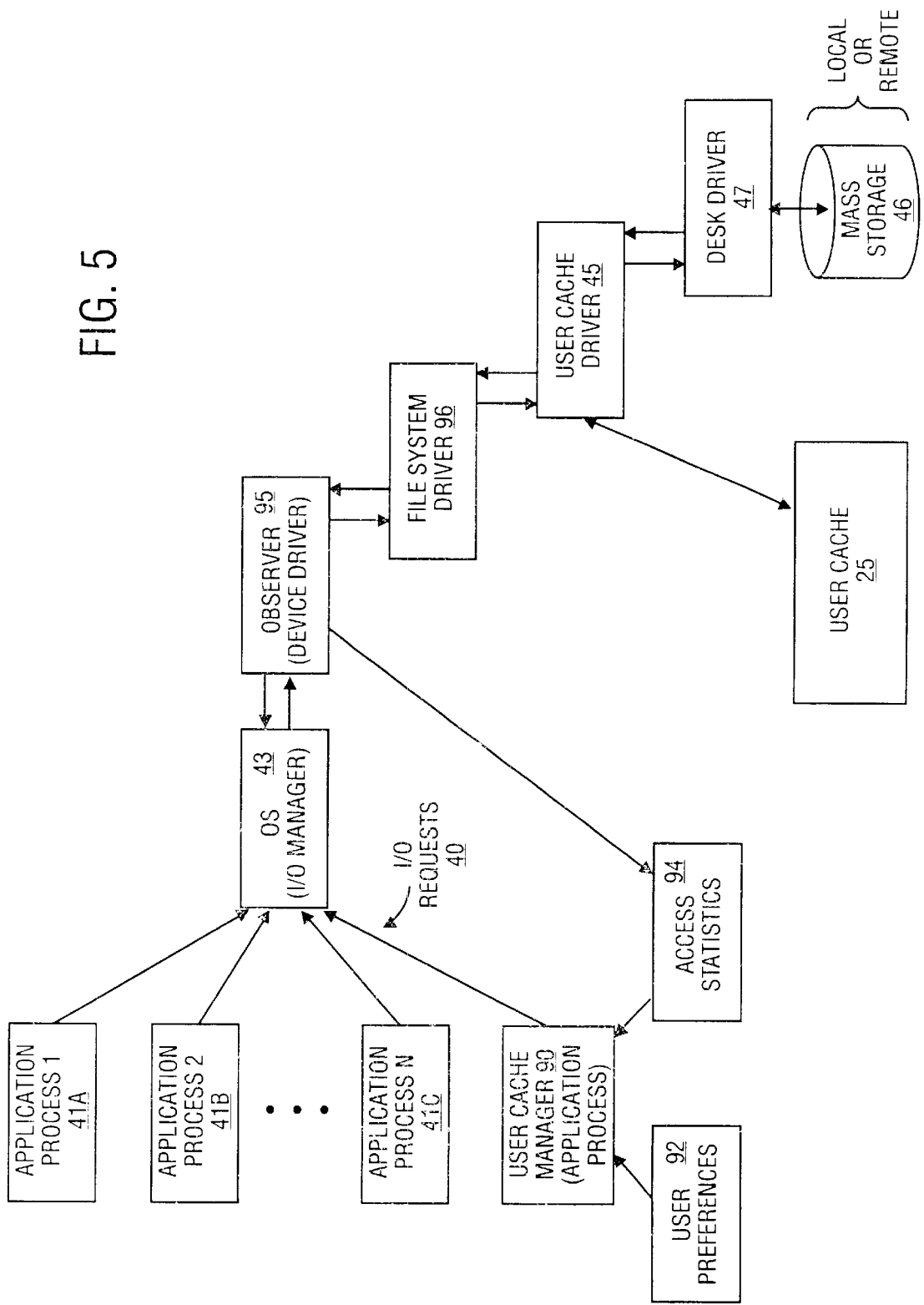
FIG. 5 illustrates the processing of I/O requests according to one embodiment.

FIG. 5 illustrates the processing of I/O requests according to one embodiment. A number of application processes 41A–41C, including a user cache manager 90, submit I/O requests 40 to the operating system where they are handled by the I/O manager 43. According to one embodiment, the I/O manager 43 first passes the I/O requests to a device driver called an observer 95. The observer 95 tabulates access statistics 94 that describe the individual I/O requests. For example, in one embodiment, the observer 95 records a time stamp indicating the time of the I/O request, a file reference indicating a data structure that contains various file attributes, a value indicating the nature of the I/O request (e.g., read, write, open, close, delete, etc.), and values indicating the portion of data to be read or written (e.g., a starting point in a file and a number of bytes to read or write, or a starting point and an ending point in a file). In alternate embodiments, more or less information may included in the data structure indicated by the file reference. As discussed below, the user cache manager 90 uses the access statistics 94 recorded by the observer 95 to make preloading decisions.

The observer 95 forwards each I/O request to a file system driver 96 for the type of file system in use by the logical drive sought to be accessed. Examples of commonly used file systems include a File Allocation Table (FAT) based file system and the New Technology File System (NTFS). The file system driver 96 converts the file-based access to a block-based access that indicates the logical blocks of mass storage sought to be accessed. Blocks are units of storage within a mass storage device. The user cache driver 45 receives the block-based access request and determines whether the blocks sought to be accessed are present in the user cache 25. If so, the access occurs in the user cache 25. If the blocks sought to be accessed are not in the user cache 25, the user cache driver 45 forwards the access request to the disk driver 47 which then accesses the indicated blocks on the mass storage 46 (e.g., disk). When the access is completed, the call stack through the device drivers is unwound back to the I/O manager 43 and then to the application process 41A–41C that issued the original 1/0 request 40.

As discussed above, the mass storage device 46 accessed by the disk driver 47 need not be local to the computer system that contains the user cache 25. Network databases, including Internet and World Wide Web ("Web") based databases are increasingly popular, especially among large corporate enterprises. In many cases, network database usage is limited by the performance and reliability of the network itself (particularly in the case of the Web). The user cache can be used to mitigate both limitations by operating as a local host-based storage for data from a remote database. In one embodiment, coherency is maintained between the remote database and the user cache through periodic polling of the remote database to determine whether the database has been updated. Writes to the remote database that hit the user cache may write through the user cache to the remote database or write backs to the remote database may be deferred until an appropriate time or triggering event (e.g., elapsed period of time, interrupt or other detectable event). In one embodiment, for example, user cache updates and write backs to the remote database are triggered by pushed communication from the remote server.

Once data from the remote database is cached in the user cache, the host computer can access the data virtually instantly, avoiding the performance and reliability issues inherent in the network and reducing the overall network traffic. Thus, the mass storage device 46 may be resident in a server that is accessed via a local area network, a wide area network or through an interconnection between multiple networks (e.g., the Internet). In at least one embodiment, network I/O, including network communication via internet protocols (e.g., hyper-text transfer protocol (HTTP), file transfer protocol (FTP) and so forth), is handled by device drivers in the host computer and may be intercepted in a manner similar to that described above in reference to FIGS. 2 and 4. For example, the mass storage device 46 may be a disk drive on a network server that is accessed over a local area network or a disk drive on a web server that is accessed via a dial up line to an Internet service provider which then provides access to the web server over a wide area network. Generally, any I/O request may be redirected by the user cache driver 45 to access the user cache 25 if the data has previously been stored in the user cache 25, regardless of whether the original source of the data is local or remote.

In various embodiments discussed below, the user cache manager 90 generates a user interface on a display of the host computer system to allow a user to configure the operation of the user cache 25. In general, there are two types of storage operations that take place in the user cache: preloading and responsive caching. Responsive caching refers to the storage of data in the user cache in response to I/O requests from application processes. In a preload operation, by contrast, data is retrieved from mass storage and stored in the user cache before being requested for use in an application process. In one type of preloading, called commanded preloading, data is preloaded according to user-provided criteria. For example, the user may command, via a user interface presented by the user cache manager 90, that specific files, specific file types or files from a specific source such as a disk drive or subdirectory be loaded into the cache, even before the files are requested by application processes. This is shown in FIG. 5 by the user preferences supplied to the user cache manager. In another type of preloading, called triggered preloading, data is preloaded when the access statistics 94 gathered by the observer 95 indicate that a user-specified threshold is exceeded. As discussed below, numerous user supplied parameters may be used to control commanded and dynamic preloading operations.

As shown in FIG. 5, the user cache manager 90 may be one of a number of application processes in a multiprocessing computer system. In one embodiment, the user cache manager 90 operates in the background to perform commanded and triggered preloading operations until selected by the user. When selected by the user, the user cache manager 90 generates a user interface to allow the user to configure the operation of the user cache 25 and specify commanded and triggered preload parameters. Exemplary user interface displays and dynamic and commanded preload parameters are discussed in further detail below.

After a user has specified a set of commanded preload parameters, the user cache manager 90 responds by generating I/O requests to retrieve the data identified by the preload parameters from mass storage 46. Generally, I/O requests from the user cache manager 90 are handled in the same manner as I/O requests from any other application process, except that, when the requested data is obtained from mass storage 46, the data is loaded into the user cache 25 without being returned to the user cache manager 90. Assume for example, that the user specifies that all the files in the system directory "C:\SYSTEM\" are to be preloaded. The user cache manager 90 will respond to this preload command by issuing I/O requests to retrieve the files from the indicated logical drive and directory. As discussed above, the I/O manager 43 responds to the I/O requests by invoking the observer 95 which in turn invokes the file system driver 96. Based on the file system in use by the logical drive, the file system driver 96 converts the filename/source designation of the data sought to a form that indicates the logical drive and the blocks of data sought from the logical drive, and then forwards the blocks/logical drive and block request to the user cache driver 45. The user cache driver 45 determines whether the requested blocks are already stored in the user cache 25. If so, the user cache driver indicates that the preload I/O request is complete and the device driver call stack is unwound to the I/O manager 43 which notifies the user cache manager 90 that the I/O request is completed. If the user cache driver 45 determines that the requested blocks are not present in the user cache 25, the user cache driver 45 forwards the request to the device driver for the indicated logical drive which, in turn, accesses the mass storage 46 to obtain the requested blocks. The requested blocks are then passed back to the user cache driver 45 which writes them to the user cache 25 and updates the user cache directory. The user cache driver 45 then indicates that the requested access is complete as described above. The user cache manager 90 continues to issue I/O requests in the background until all commanded preloads are completed.

In one embodiment, the user cache manager 90 accesses the user cache directory before issuing I/O requests to avoid requesting to preload data already stored in the user cache 25. Also, as discussed below, the user may specify that certain preloaded files are to be locked down in the user cache 25. The user cache manager 90, in turn, issues a special "lock down" I/O request. The user cache driver 45 responds to the lock down I/O request by caching the requested data as described above and by marking the directory entry associated with the requested data with a lock down tag to prevent the data from being flushed from the user cache 25.

In addition to carrying out commanded preload operations, the user cache manager 90 supports triggered preloading based on access statistics 94 recorded by the observer 95. The user cache manager 90 periodically inspects the access statistics 94 and compares the statistics against user-specified criteria to determine whether to perform a triggered preload. For example, a user may specify that, after a threshold number of files within a directory have been accessed, all the files in the directory are to be preloaded. Thereafter, if the user cache manager 90 inspects the access statistics 94 and determines that the threshold number of files within the specified directory have been accessed, the user cache manager 90 will begin preloading the remainder of the files in the directory. As another example of triggered preloading, a complete file may be preloaded in response to detecting that a portion of a file has been accessed. Similarly, preloading of files having a specified file type may be triggered upon detecting that a threshold number of files having the specified file type have been accessed within a given time interval. Numerous other criteria may be used for triggered preloading.

Figure 6:
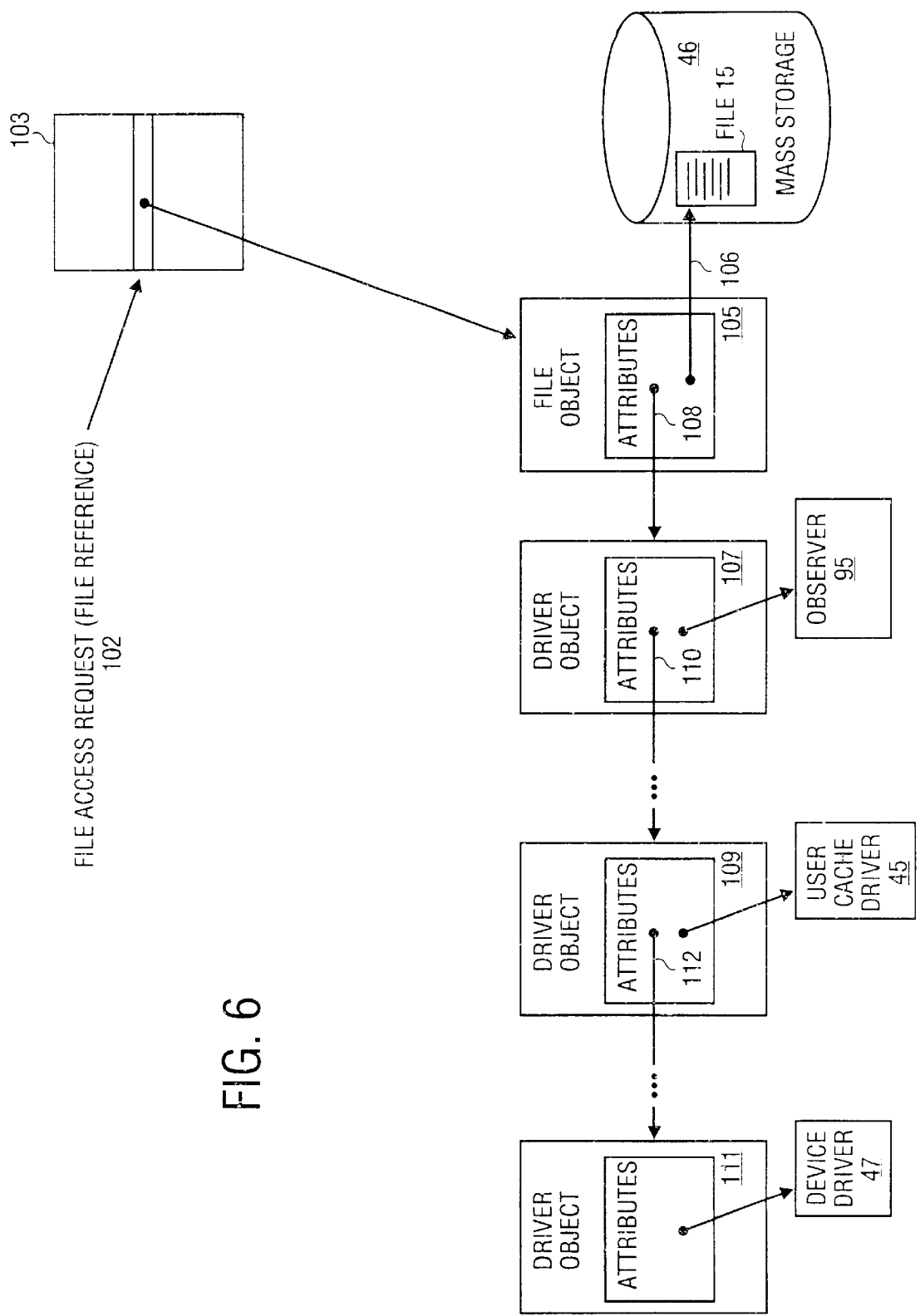
FIG. 6 illustrates file and driver objects that are used, in at least one embodiment, to determine the sequence in which device drivers are called to service an I/O request.

FIG. 6 illustrates file and driver objects that are used, in at least one embodiment, to determine the sequence in which device drivers are called to service an I/O request. When a file 15 is first opened for access, the I/O manager (e.g., element 43 of FIG. 5) instantiates a file object 105 in system memory to represent the file 15 and returns a value called a file reference 102 to the application process that requested the file to be opened. In one implementation, the file reference 102 is a value that identifies an entry in a table 103 of pointers to file objects.

According to one embodiment, each file object 105 includes a number of attributes and methods for accessing the attributes. The attributes may include, for example, an offset within the associated file 15 at which the next read or write will begin, one or more values that indicate where the file 15 is stored such as a logical storage identifier and a directory identifier (indicated graphically by arrow 106), access restriction information associated with the file such as whether the file can be written or is a read-only file, and a pointer 108 to a driver object 107 ultimately associated with a device driver 47. The driver object 107 corresponds to the observer 95 (described above) and includes a pointer 110 to a chain of driver objects (including, for example, a driver object that corresponds to the file system driver shown in FIG. 5) which ultimately points to the driver object 109 that corresponds to the user cache driver 45. The driver object 109 for the user cache driver 45 includes a pointer 112 to a lower level driver object 111 which corresponds to the device driver 47. As indicated by the ellipsis following pointer 112 in FIG. 6, additional driver objects that correspond to other device drivers (e.g., a fault tolerant driver or other multivolume driver) may be interposed between the driver object 109 and the driver object 111.

When an application process desires to access a previously opened file 15, it issues an I/O request to the I/O manager that includes the file reference 102 and parameters indicating the nature of the access (e.g., whether the operation is a read or write), the amount of data to be read or written and, in some cases, a pointer to a buffer containing the data to be written or to receive the data to be read. The I/O manager responds to the I/O request by using the file reference 102 to identify the file object 105 associated with the file 15 sought to be accessed. The I/O manager follows a pointer from the file object 105 to the top level driver object, in this case, the driver object for the observer 111. The I/O manager passes the I/O request to the device driver pointed to by the top level driver object 111 so that the observer 95 is the first device driver to receive the I/O request. The observer 95 operates on the I/O request as described above in reference to FIG. 5 and passes the request on to the next level device driver indicated by the chain of driver objects. Each of these device drivers, in turn, operates on the I/O request as described above.

Figure 7:
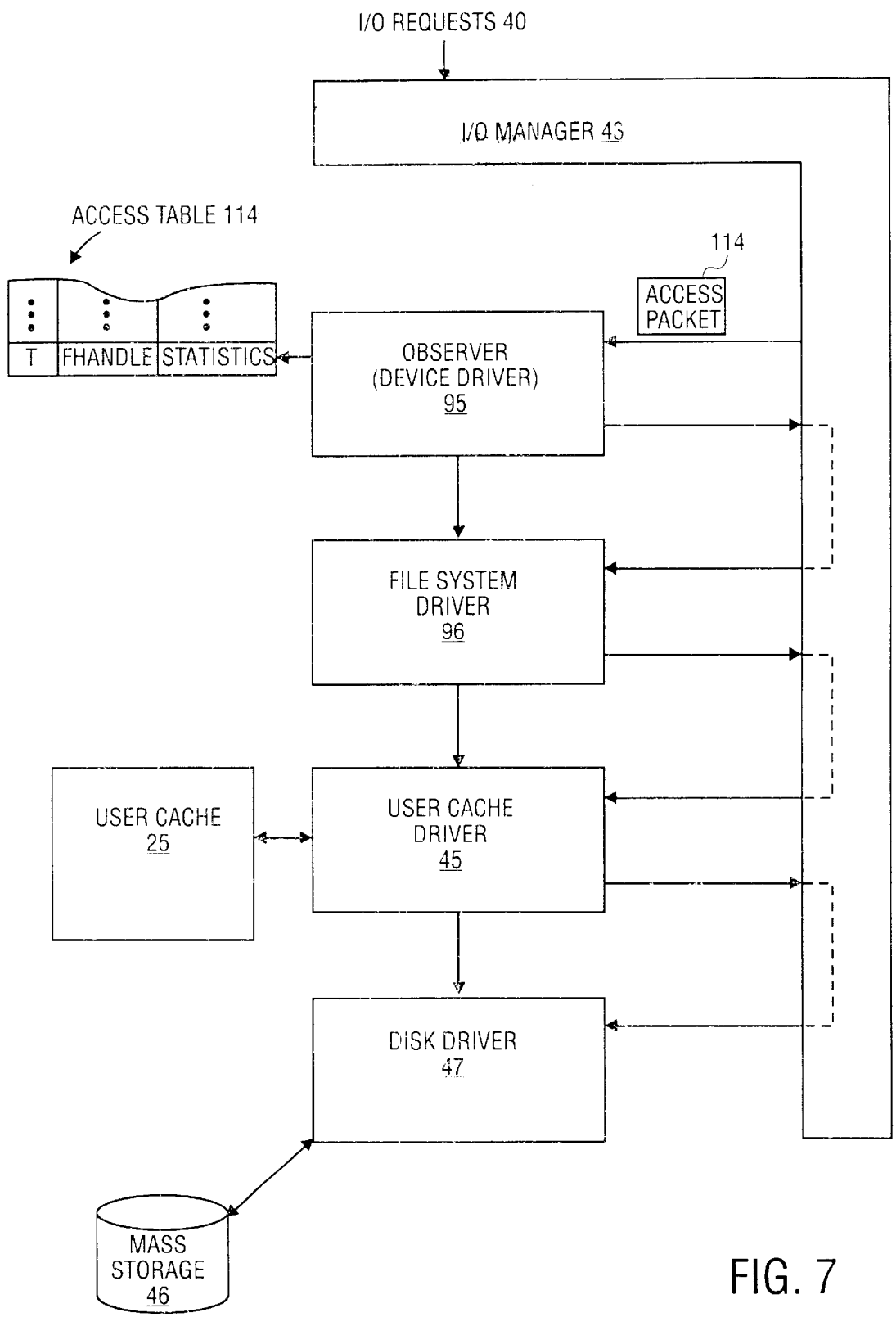
FIG. 7 illustrates the manner in which the I/O request propagates down a chain of device drivers according to one embodiment.

FIG. 7 illustrates the manner in which the I/O request propagates down a chain of device drivers according to one embodiment. As discussed above, an I/O request 40 is initially received in the I/O manager 43 which determines the sequence of device drivers to be accessed to complete the request. According to one embodiment, the I/O manager communicates with device drivers via units of information referred to herein as access packets 114. Each access packet 114 includes a stack that indicates, among other things, how many device driver levels have been traversed to reach the current device driver. The I/O manager 43 uses the stack to determine the sequence of device drivers to be called to unwind the I/O request (i.e., to proceed back up the chain of device drivers). When a device driver receives an access packet 114 from the I/O manager 43, the device driver performs the requested operation, stores context information in the stack along with any information needed by the next driver in the hierarchy and passes the access packet to the next device driver in the chain via the I/O manager. The I/O manager includes routines for routing access packets 114 between device drivers, thus avoiding the need to include access packet transmission routines in each device driver. Referring to FIG. 7, for example, the observer 95 receives an access packet 114 that includes a handle to the file object and values indicating the amount of data to be accessed, the nature of the access and so forth. The observer 95 records access statistics including the present time, the file reference and so forth, then forwards the packet to the file system driver 96 via the I/O manager 43. In alternate embodiments, the I/O manager 43 could update the stack of the access packet 114 or the stack could be avoided altogether by listing the sequence of device drivers that have received a given access packet 114 in a separate data structure (e.g., a data structure maintained by the I/O manager).

The file system driver 96 converts the file-based access request to a block-based access request as discussed above, then updates the stack in the access packet 114 and forwards the access packet 114 to the user cache driver 45 via the I/O manager 43. The user cache driver 45 compares the blocks indicated by the access packet 114 to the directory of the user cache 25 to determine if the blocks are present in the user cache 25. If so, the I/O request is redirected to the user cache 25 as discussed above. If the blocks indicated by the access packet 114 are not present in the user cache 25, the user cache driver 45 forwards the access packet to the disk driver 47 via the I/O manager 43. The disk driver 47 performs the requested access, then passes the access packet 114 to the I/O manager. The I/O manager inspects the stack of the access packet 114 to determine the unwind path for the access packet 114. Thus, the access packet 114 is passed back to the user cache driver 45 which determines whether the data accessed by the disk driver 47 is to be cached in the user cache. If so, the user cache driver 45 retrieves the data to be cached from the buffer pointed to by the buffer pointer in the access packet 114. For example, in the case of a read operation, an initially empty buffer will have been filled by the operation of the disk driver 47. In one embodiment, the pointer to the buffer is included in the access packet 114 and therefore can be referenced by the user cache driver 45 to load the read data from the buffer into the user cache 25. Similarly, in the case of a write operation, a pointer to the data to be written is present in the access packet 114 and can be used by the user cache driver 45 to load the write data from the buffer into the user cache 25.

In one embodiment, the decision whether to store the returned data in the user cache is made when it is determined that the access request misses the user cache. A flag indicating the user cache miss may be stored in the access packet 114 to alert the user cache driver when the access packet 114 unwinds to the user cache driver after the data has been retrieved from the mass storage 46. After loading data into the user cache 25, the user cache driver 45 updates the user cache directory to indicate the newly cached blocks. The user cache driver 45 passes the access packet 114 back to the I/O manager 43 when the cache operation, if any, is completed and the access packet 114 is similarly passed back through the file system driver 96 and observer 95 to complete the stack unwind.

User Preferences

Figure 8:
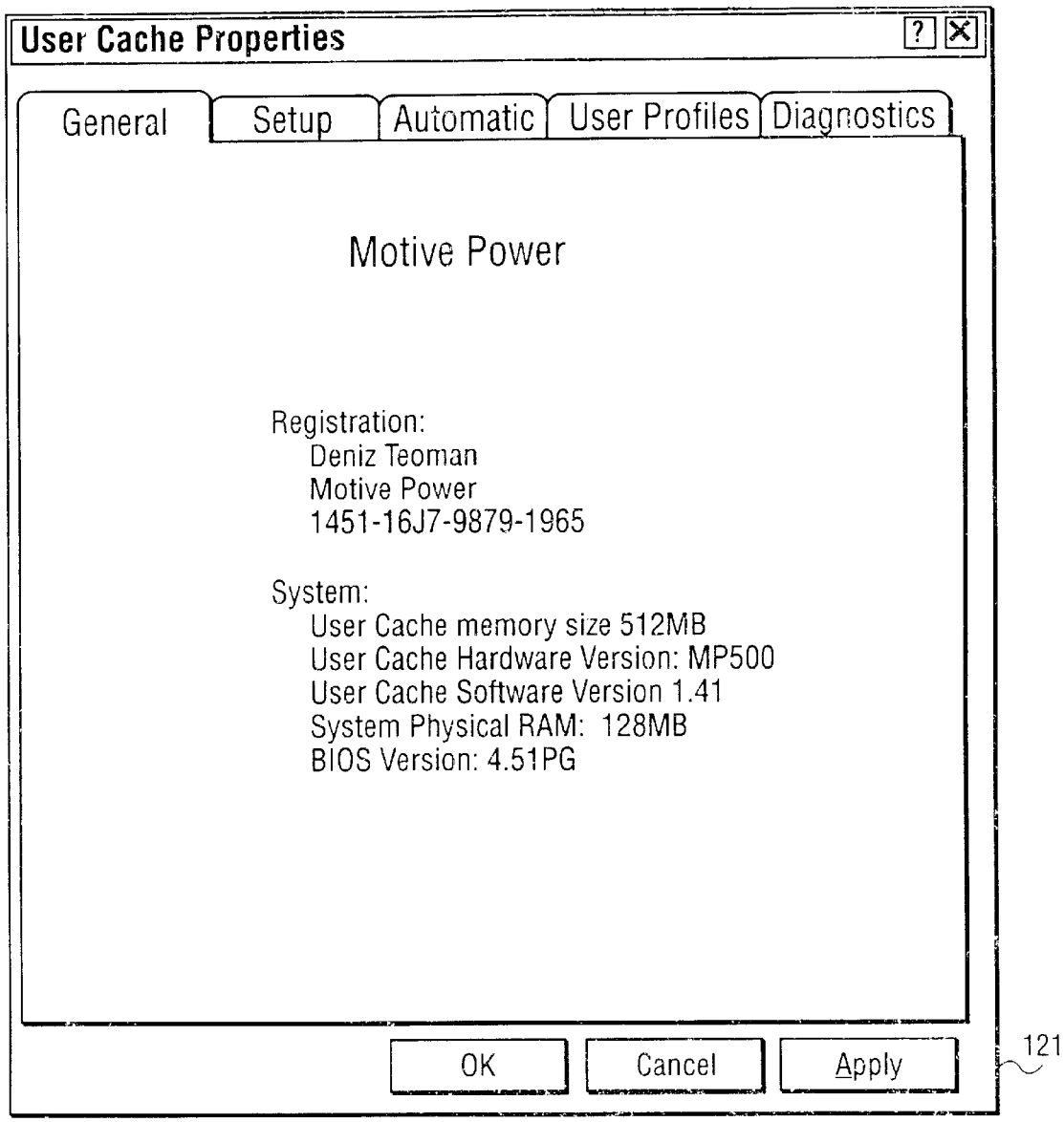
FIG. 8 is an exemplary user interface generated by the user cache manager to inform the user of general information related to the user cache and the system in which the user cache is installed.

FIG. 8 is an exemplary user interface 121 generated by the user cache manager to inform the user of general information related to the user cache and the system in which the user cache is installed. The user interface 121 lists the memory size of the user cache, the size of the system physical RAM, the software version of the basic input/output service (BIOS), the hardware version of the user cache and the software version of the user cache manager application process. The user interface 121 also indicates the person to whom the user cache manager software is licensed and a registration number for the user cache manager software. Additional information may be provided in alternate embodiments.

Figure 9:
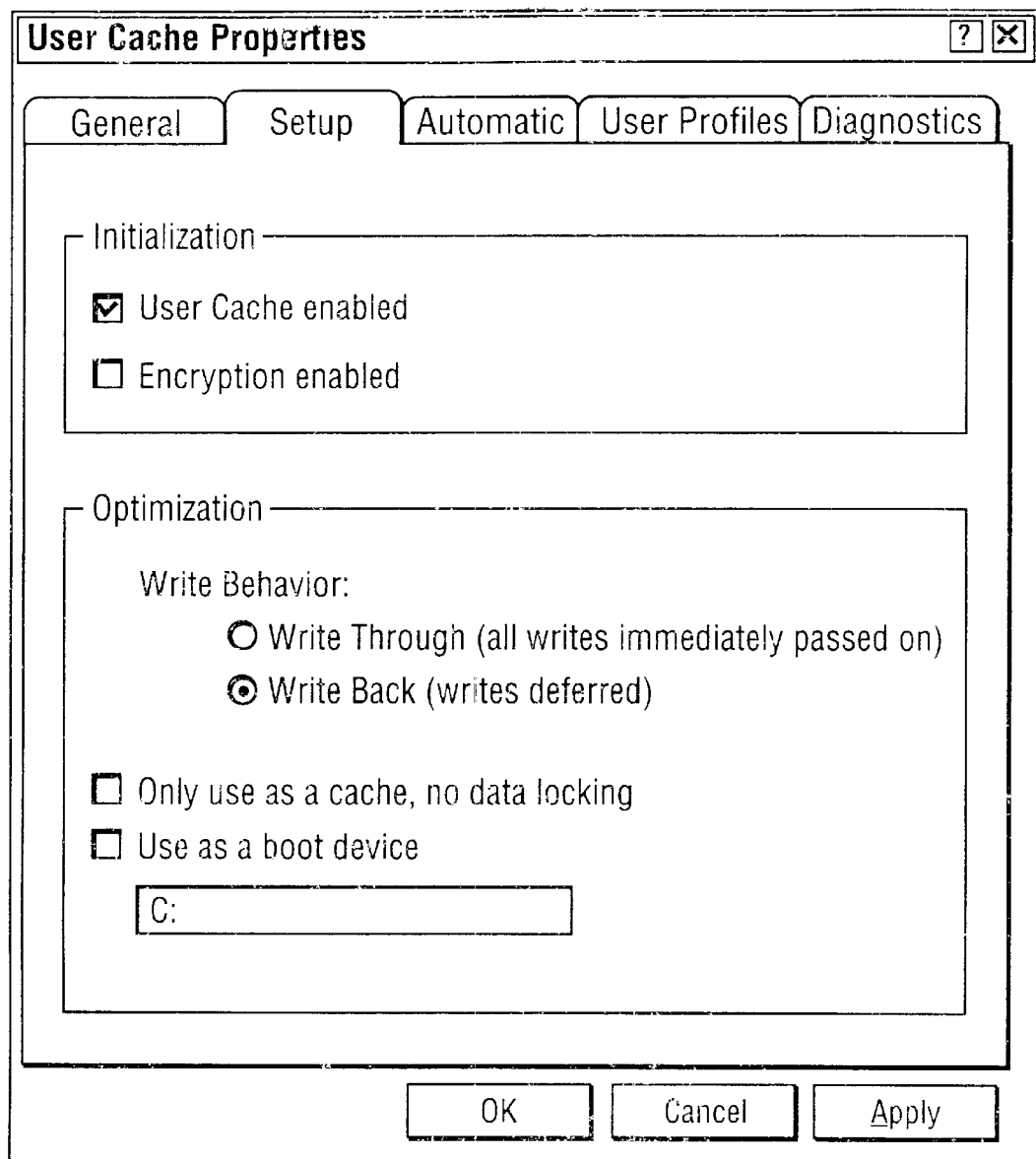
FIG. 9 is an exemplary user interface generated by the user cache manager to enable the user to turn on and configure the basic operation of the user cache.

FIG. 9 is an exemplary user interface 123 generated by the user cache manager to enable the user to turn on and configure the basic operation of the user cache. For example, the user may configure the user cache to operate as a write-through or a write-back cache. When write-through operation is selected, all writes to the user cache are immediately passed to a lower level device driver to also write the corresponding regions of disk or other mass storage. When write-back operation is selected, writes to the corresponding regions of physical storage are deferred until a triggering event is detected, such as passage of a predetermined period of time, system idle, receipt of a threshold number of I/O requests, receipt of a write back request from the operating system or user cache manager, and so forth. Because, in at least one embodiment, the user cache is non-volatile, write backs to mass storage may also be deferred until after a subsequent restart of the computer system. The advantage of this approach is that a user would not need to wait for files to be completely written out to mass storage before quitting an application program or shutting down the computer system. Any I/O write requests are quickly written to the user cache and write-backs to the mass storage device are postponed until the next system startup or other write-back-triggering event.

The user interface 123 also permits the user to configure the computer system to use the user cache as a boot device, meaning that the user cache will be treated as a source of boot software at system startup. In one embodiment, if the user enables the "Use as a boot device" option, the user cache manager process prompts the user to specify the logical drive that is ordinarily the source of boot software. The user cache manager software responds by interacting with the BIOS configuration to treat the user-cache as the user-specified logical drive and thereby to boot out of the user-cache at system startup.

In another embodiment, the user cache driver is loaded very early in the OS boot sequence and is operable for most of the sequence. Most operating systems support loading device drivers early in the boot sequence so that, in most cases, this mode of operation requires no special hardware or software support.

In another embodiment, boot program code in the user cache firmware is executed to redirect boot time I/O requests before the operating system is loaded. In this way, boot time I/O requests are redirected to the user cache, making the user cache operable as a source of boot files during the entire boot sequence.

In yet another embodiment for using the user cache to support system startup, before the OS boot sequence is begun, boot program code in the user cache firmware is executed to notify the system BIOS that the user cache is a bootable mass storage device. Also, when executed, the boot program code loads software into system memory for operating the user cache as a bootable mass storage device. In this embodiment, the user selects the user cache as the boot device in the system BIOS settings. Then, during the boot sequence, the operating system accesses boot up files in the user cache. During the boot sequence, the user cache continues to operate as a cache; requests that cannot be fulfilled by the user cache are forwarded to the appropriate mass storage device.

Still referring to FIG. 9, the user interface 123 also permits the user to configure the user cache to operate without locking down data in the user cache. In alternate embodiments, the user interface 123 may also permit the user to configure the user cache to perform other operations, including, but not limited to, encryption/decryption of stored data, defragmentation of mass storage devices and data integrity checking.

Encryption/Decryption: The user cache provides an opportunity to process large amounts of data on a deferred basis, independently of the mass storage device ultimately used to store the data. Consequently, the user cache is ideal for implementing an encrypting storage system. When requests to write data to mass storage are issued, the requests are intercepted and the data is written instead to the user cache. In one embodiment, a user specified encryption algorithm and encryption key are used to encrypt data written to the user cache and, if appropriate, to decrypt data retrieved from the user cache. When data is eventually written out to the mass storage, the data can be written in its secure, encrypted form. When an I/O read request is issued, the data may either be found in the user cache, in which case it is decrypted before being returned, or encrypted data from the mass storage may be brought into the user cache and decrypted before it is returned to the querying source. Encryption and decryption processing may be performed either by a local dedicated processor on board the user cache or by a background task operated by the central processing unit of the host computer.

Defragmentation: In most computer systems, files are stored in blocks of data that tend to become scattered (discontiguous) over time, a phenomenon called fragmentation. As fragmentation becomes more pronounced, file read and write operations tend to take longer because of the need for electro-mechanical storage devices (especially disk drives) to seek for the discontiguous blocks. Typically, user-invoked application programs called defragmenters are executed to consolidate scattered file blocks into contiguous sets of blocks.

According to one embodiment, the user cache is used to implement an automatic defragmenter. When data is written to a mass storage device as part of an I/O write operation, the data is stored instead on the user cache. The data is held on the user cache until sufficient contiguous blocks of storage are determined to be available on the target mass storage device. At that point the data is forwarded to the mass storage device for storage in the contiguous blocks. In one embodiment, a background application program called a background defragmenter is executed to rearrange existing blocks of mass storage into contiguous sequences of blocks, thereby increasing the number of contiguous blocks of storage available for new data. In this way, manual defragmentation (i.e., user invoked defragmentation programs) are not needed and mass storage devices are automatically maintained in a substantially less fragmented condition.

Data Integrity Checking: Because data stored in the user cache corresponds to and should be a duplicate of data stored in a mass storage device, data integrity checking can be implemented. In one embodiment, data in the user cache is periodically compared against the corresponding data in the mass storage device. If the data does not match, the operating system or user (or both) may be alerted so that an archive of the correct data may be generated. In most cases, the mass storage device will be the source of corrupted data so that the archive of correct data is drawn from the user cache. This is a significant benefit afforded by the user cache, because mass storage devices such as disk drives are often the least reliable component in a computer system. Thus, the duplicate storage in the user cache allows a user to be immediately alerted when corrupted data is detected and permits a archive of an uncorrupted version of the corrupted data to be generated.

Figure 10:
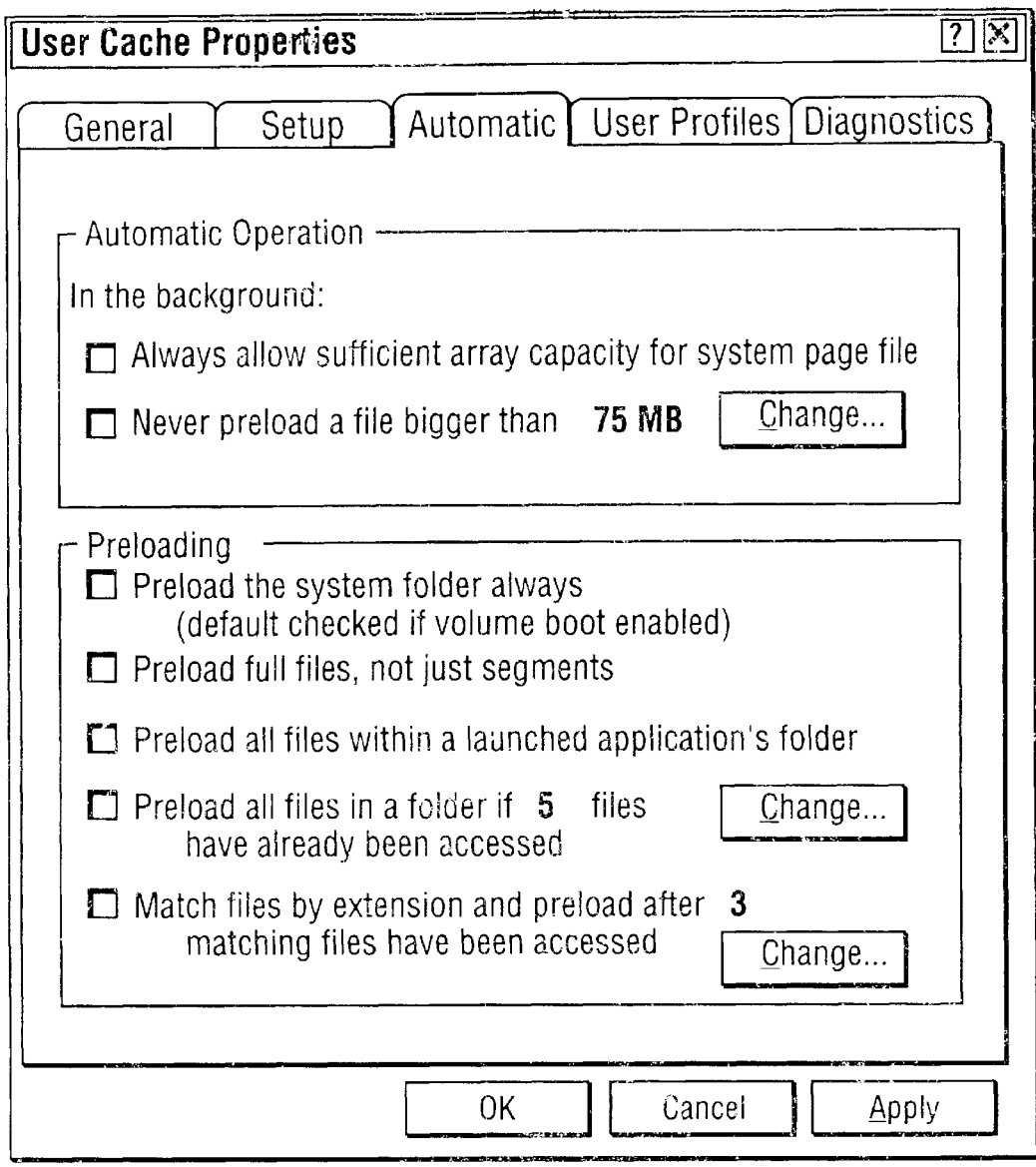
FIG. 10 is an exemplary user interface generated by the user cache manager to permit the user to configure memory management and preloading policies for the user cache.

FIG. 10 is an exemplary user interface 125 generated by the user cache manager to permit the user to configure memory management policies and preloading policies for the user cache. One user-configurable memory management policy is whether to reserve storage space in the user cache for storing a system page file. The system page file is the portion of allocated virtual memory not mapped to system RAM. Ordinarily the system page file is mapped to a disk drive or other mass storage device. By reserving capacity for the system page file in the user-cache, the system page file can be swapped between the user cache and system RAM much more quickly than if the disk drive or other mass storage device was used to hold the page file. Another user configurable memory management policy is the maximum preloadable file size. As shown in FIG. 10, for example, the user may specify that files larger than a user entered threshold are not to be preloaded.

In the context of reserving capacity in the user cache, it should be noted that a significant benefit of the user cache is that storage space is provided for both preloading and responsive caching operations without having to specifically dedicate respective regions of the user cache storage space for those operations. In an alternate embodiment, however, the user cache may be partitioned into respective dedicated storage regions for the preloading and responsive caching operations.

Examples of preloading policies include, but are not limited to, preloading complete files in response to file segment access, preloading all files within the directory or folder of a launched application, preloading all files in a directory or folder if a threshold number of files from the directory or folder have already been accessed, preloading files in the system directory or folder, preloading files having a particular file type identifier if a threshold number of files having the file type identifier have been accessed, and so forth. The file type identifier may be a filename extension such as ".doc" or ".psd", as used in many operating systems, or the file type identifier may be a file attribute that does not appear in the file name. Also, as indicated in FIG. 10, the threshold number of files that have a particular file type identifier and the threshold number of files that are from a directory or folder are specified by the user. In many cases, the preloading policies translate directly into criteria for triggered preloading. For example, a policy to preload all files in a directory or folder if a threshold number of the files have been accessed sets up a preload trigger. The user cache manager periodically inspects the access table maintained by the observer to determine if the trigger criteria is met (e.g., whether the threshold number of files from the indicated directory have been accessed). Other preload policies give rise to commanded preload operations. For example, a policy to preload the system directory causes the user cache manager to begin commanded preloads of the directory contents.

Figure 11:
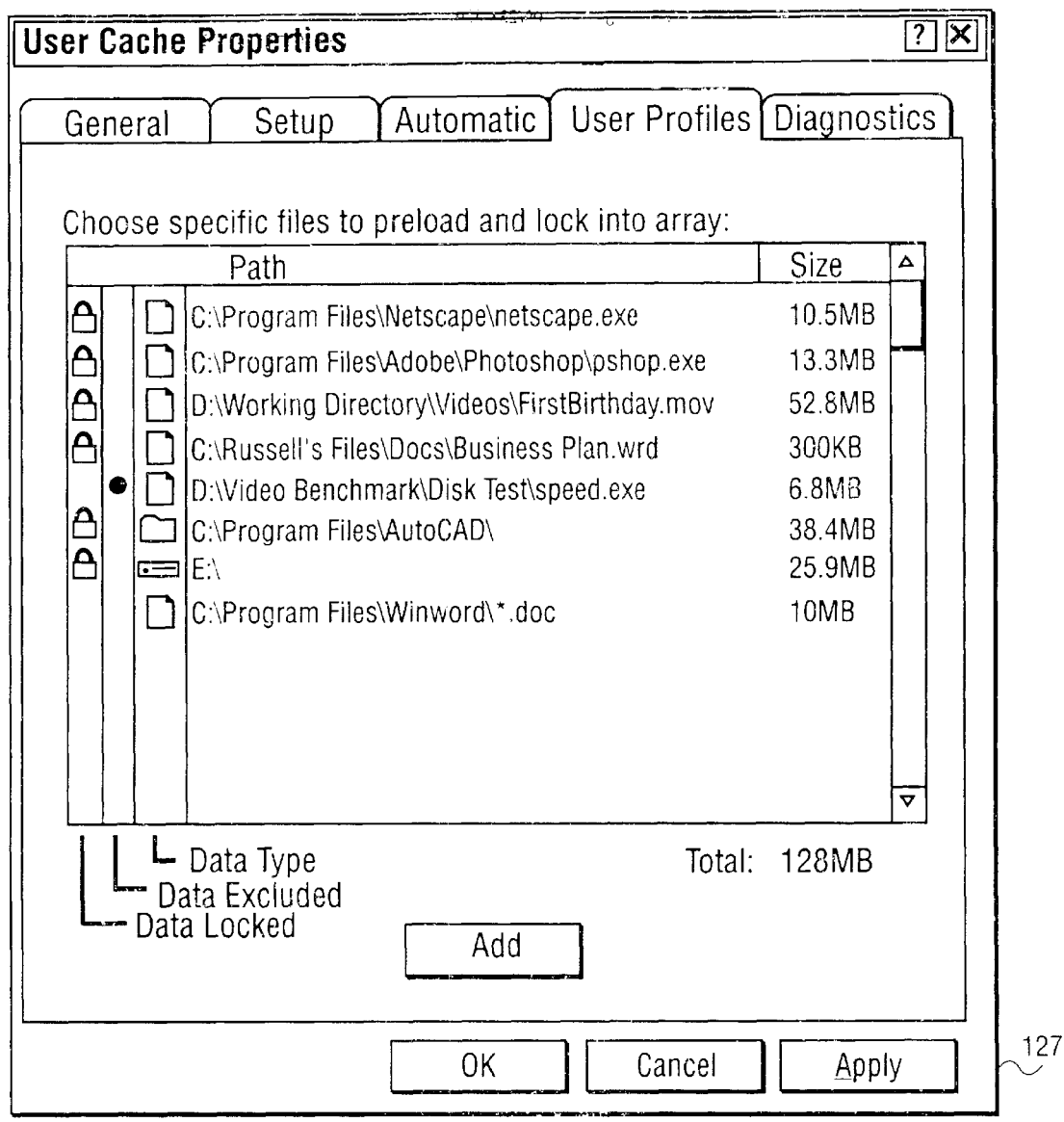
FIG. 11 is an exemplary user interface generated by the user cache manager to allow the user to specify commanded preloads.

FIG. 11 is an exemplary user interface 127 generated by the user cache manager to allow the user to specify commanded preloads. According to one embodiment, a user enters a commanded preload in the interface of FIG. 11 by clicking the add button on the user interface 127. The user cache manager responds by generating a view of the file storage within the computer system. The user may then double click selected logical drives, directories or filenames to indicate that files meeting the specified criteria are to be preloaded. For example, the user may select the file "C:\Program Files\Netscape\netscape.exe" to indicate that the netscape.exe file is to be preloaded into the user cache from the specified logical drive and directory (likewise for pshop.exe, FirstBirthday.mov and Business Plan.wrd). Similarly, the user may select the directory "C:\Program Files\AutoCAD\" to indicate that all the files in the drive C: subdirectory "\Program Files\AutoCAD\" are to be preloaded. The user may also select the drive E:\ to indicate that all the files in drive E are to be preloaded. The user may also enter wildcards within filenames to indicate that files having filenames that match the wildcard are to be preloaded. For example, to load all files having the extension ".doc" from the logical drive and directory, "C:\Program Files\Winword\", the user would select the indicated logical drive and directory and enter "*.doc" (i.e., "C:\Program Files\Winword\*.doc"). After entering file parameters in the interface of FIG. 11, the user may click the apply button to initiate commanded preloading.

The user may also indicate, via the user interface 127 of FIG. 11, to lock down selected files in the user cache. In one embodiment, for example, selected files are locked down in the user cache in response to the user clicking in the left most column of the interface adjacent a commanded preload entry. A lock symbol is displayed to indicate that the files covered by the commanded preload entry will be locked down in the user cache. The lock down indication can be removed by clicking on the lock symbol.

The column to the right of the lock down column is an exclude column and can be used to exclude certain files from the user cache. For example, by clicking in the exclude column adjacent the preload entry "D:\Video Benchmark\Disk Test\speed.exe", the executable file speed.exe is prevented from being loaded into the user cache, either by preloading or by responsive caching.

Figure 12:
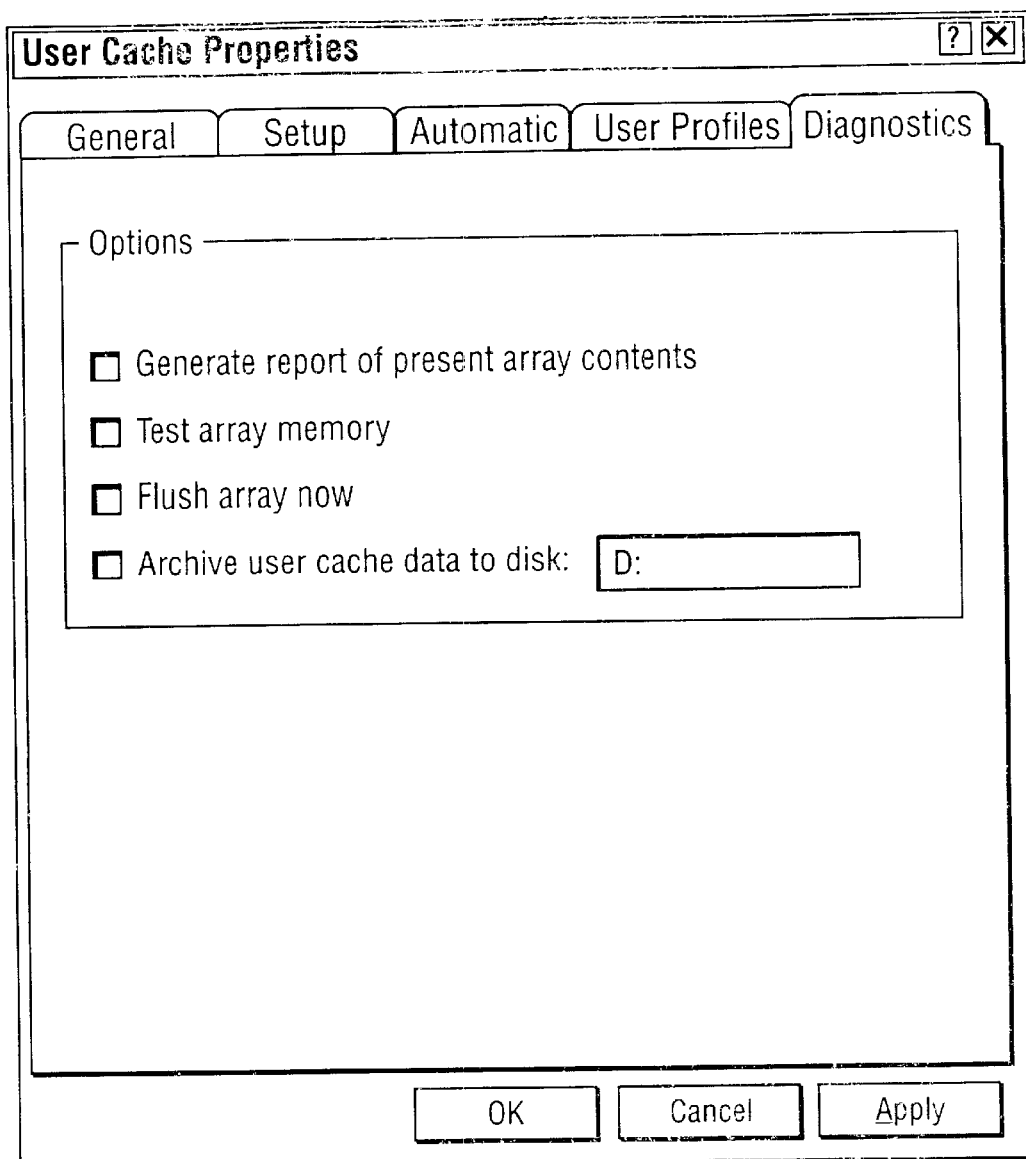
FIG. 12 is an exemplary user interface generated by the user cache manager to permit the user to generate a report of the user cache contents, test the memory in the user cache, flush the user cache or transfer the contents of the user cache to a mass storage such as a tape backup.

FIG. 12 is an exemplary user interface 129 generated by the user cache manager to permit the user to generate a report of the user cache contents, test the memory in the user cache, flush the user cache or backup the contents of the user cache to a mass storage such as a tape backup or a disk drive. Other operations may be prompted in the user interface 129 of FIG. 12 including, but not limited to, a battery test, an age report indicating the relative order in which files have been loaded into the user cache and so forth.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of pre-loading data into a storage array operating as a user cache for a computer system, the method comprising:

causing data to be retrieved from a mass storage device in accordance with pre-load criteria, the pre-load criteria identifying data that is to be pre-loaded into the storage array prior to receiving a command on the data;

storing the data in the storage army for subsequent access by commands on the data;

inspecting a request for data from a process; causing the requested data to be retrieved from a mass storage device if the requested data is not in the storage array; and p1 storing the requested data in the storage array in accordance with exclusion criteria that specifies data excluded from storage in the storage array using a file identifier.

2. The method of claim 1 further comprising:

obtaining the pre-load criteria from a user of the computer system.

3. The method of claim 2 further comprising:

displaying a user interface to obtain the pre-load criteria.

4. The method of claim 1, wherein the pre-load criteria specifies a file to be pre-loaded in the storage array.

5. The method of claim 4, wherein the pre-load criteria further specifies a logical drive and directory for the file.

6. The method of claim 4, wherein the pre-load criteria further specifies a file type.

7. The method of claim 1, wherein the pre-load criteria specifies a threshold and wherein the data is retrieved when the threshold is exceeded.

8. The method of claim 7 further comprising:

determining when the threshold is exceeded.

9. The method of claim 8, wherein the threshold is a number of files accessed within a specified directory.

10. The method of claim 8, wherein the threshold is number of files accessed with a specified file type.

11. The method of claim 1, wherein storing the data comprises overwriting existing data in the storage array.

12. The method of claim 1 further comprising protecting the data from being overwritten in the storage array.

13. The method of claim 1, wherein the file identifier specifies a file type.

14. The method of claim 1, wherein the file identifier specifies a portion of a filename.

15. The method of claim 14, wherein the portion of a filename includes a file extension.

16. The method of claim 1, wherein the storage array is distinct from system memory in the computer system.

17. The method of claim 1, wherein the storage array is a non-volatile memory.

18. The method of claim 1, wherein the storage array is a solid state memory.

19. The method of claim 1, wherein the storage array comprises one or more battery-backed dynamic random access memory (DRAM) components.

20. A computer system comprising:

a processing unit;

a system memory coupled to the processing unit;

a mass storage unit coupled to the processing unit;

a storage array distinct from the system memory and coupled to the processing it to operate as a user cache; and computer-executable instructions that cause the processor to evaluate pre-load criteria upon initialization of the instructions, the pre-load criteria identifying data that is to be pre-loaded into the storage array prior to receiving a command on the data, to retrieve the data from the mass storage unit in accordance with the pre-load criteria, to store the data in the storage array for subsequent access by commands on the data, to inspect a request for data from a process, to cause the requested data to be retrieved from a mass storage device if the requested data is not in the storage array, and to store the requested data in the storage array in accordance with exclusion criteria that specifies data excluded from storage in the storage array using a file identifier.

21. The computer system of claim 20 further comprising instructions that cause the processor to re-evaluate the pre-load criteria in response to a change in the pre-load criteria.

22. The computer system of claim 20, wherein the storage array is a non-volatile memory.

23. The computer system of claim 20, wherein the storage array is a solid state memory.

24. The computer system of claim 20, wherein the storage array comprises one or more battery-backed dynamic random access memory (DRAM) components.

25. A computer-readable medium having computer-executable instructions comprising:

causing data to be retrieved from a mass storage device in accordance with pre-load criteria, the pre-load criteria identifying data that is to be pre-loaded into a storage array prior to receiving a command on the data;

storing the data in the storage array for subsequence access by commands on the data, the storage array acting as a user cache for a computer system;

inspecting a request for data from a process;

causing the requested data to be retrieved from a mass storage device if the requested data is not in the storage array; and storing the requested data in the storage array in accordance with exclusion criteria that specifies data excluded from storage in the storage array using a file identifier.

26. The computer-readable medium of claim 25 having further computer-executable instructions comprising:

displaying a user interface to obtain the pre-load criteria from a user of the computer system.

* * * * *

UNITED STATES PATENT AND TRADEMARK OFFICE
CERTIFICATE OF CORRECTION

| | | |
|---|---|---|
| PATENT NO. | : 6,463,509 B1 | |
| APPLICATION NO. | : 09/238656 | |
| DATED | : October 8, 2002 | |
| INVENTOR(S) | : Teoman et al. | |

It is certified that error appears in the above-identified patent and that said Letters Patent is hereby corrected as shown below:

<u>Column 16, Line 56, Claim 1</u>
Please replace "army" with --array--

<u>Column 16, Line 61, Claim 1</u>
Please delete "p1" between --and -- and --storing--

Signed and Sealed this

Eighteenth Day of October, 2011

David J. Kappos
*Director of the United States Patent and Trademark Office*